United States Patent
Osborne et al.

(10) Patent No.: US 8,342,163 B2
(45) Date of Patent: Jan. 1, 2013

(54) AGGREGATE CUTTING SAW CHAIN

(75) Inventors: Ian S. Osborne, Hillsboro, OR (US); James L. Vanderzanden, Sherwood, OR (US)

(73) Assignee: Blount, Inc., Portland, OR (US)

( * ) Notice: Subject to any disclaimer, the term of this patent is extended or adjusted under 35 U.S.C. 154(b) by 316 days.

(21) Appl. No.: 12/674,633

(22) PCT Filed: Aug. 22, 2008

(86) PCT No.: PCT/US2008/073984
§ 371 (c)(1),
(2), (4) Date: Feb. 22, 2010

(87) PCT Pub. No.: WO2009/026497
PCT Pub. Date: Feb. 26, 2009

(65) Prior Publication Data
US 2011/0061639 A1   Mar. 17, 2011

Related U.S. Application Data

(60) Provisional application No. 60/957,427, filed on Aug. 22, 2007.

(51) Int. Cl.
*B28D 1/08* (2006.01)

(52) U.S. Cl. ............... 125/21; 125/22; 83/830; 451/296

(58) Field of Classification Search .................. 451/296, 451/355; 125/21, 22; 83/830–834
See application file for complete search history.

(56) References Cited

U.S. PATENT DOCUMENTS

| | | | | |
|---|---|---|---|---|
| 3,977,288 A * | 8/1976 | Goldblatt et al. | | 83/833 |
| 4,573,386 A * | 3/1986 | Lindemann et al. | | 83/833 |
| 4,920,947 A | 5/1990 | Scott | | |
| 4,971,022 A | 11/1990 | Scott | | |
| 5,215,072 A * | 6/1993 | Scott | | 125/21 |
| 6,374,716 B1 * | 4/2002 | Weber et al. | | 83/833 |
| 6,837,138 B2 * | 1/2005 | Mang | | 83/830 |
| 7,836,808 B2 * | 11/2010 | Szymanski | | 83/833 |
| 2003/0167895 A1 * | 9/2003 | Mang | | 83/833 |
| 2004/0134478 A1 | 7/2004 | Bailey | | |
| 2007/0169598 A1 * | 7/2007 | Szymanski | | 83/13 |
| 2007/0215138 A1 * | 9/2007 | Vanderzanden et al. | | 125/21 |
| 2008/0011144 A1 * | 1/2008 | Harfst et al. | | 83/830 |
| 2008/0264230 A1 * | 10/2008 | Szymanski | | 83/831 |
| 2011/0120280 A1 * | 5/2011 | Szymanski | | 83/13 |

* cited by examiner

*Primary Examiner* — George Nguyen
(74) *Attorney, Agent, or Firm* — Schwabe Williamson & Wyatt

(57) ABSTRACT

Embodiments of the disclosure provide an aggregate cutting saw chain having a pitch in the range of approximately 0.440 to approximately 0.450. Embodiments also include tie straps and/or other components having fluid distribution features.

8 Claims, 6 Drawing Sheets

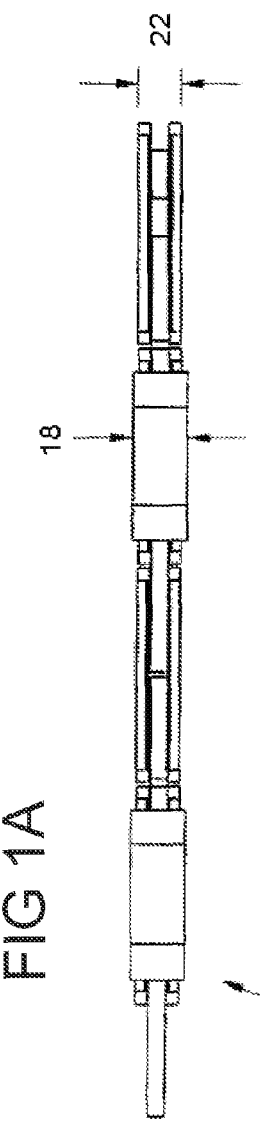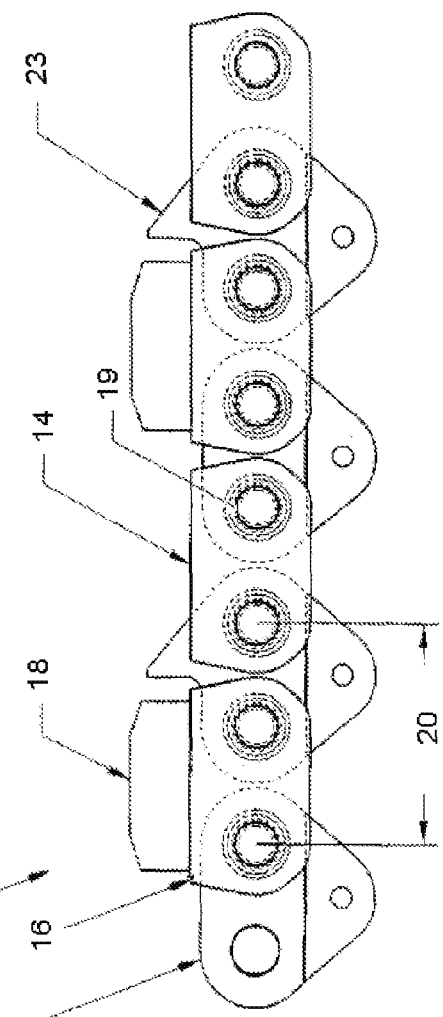
FIG 1A
FIG 1B

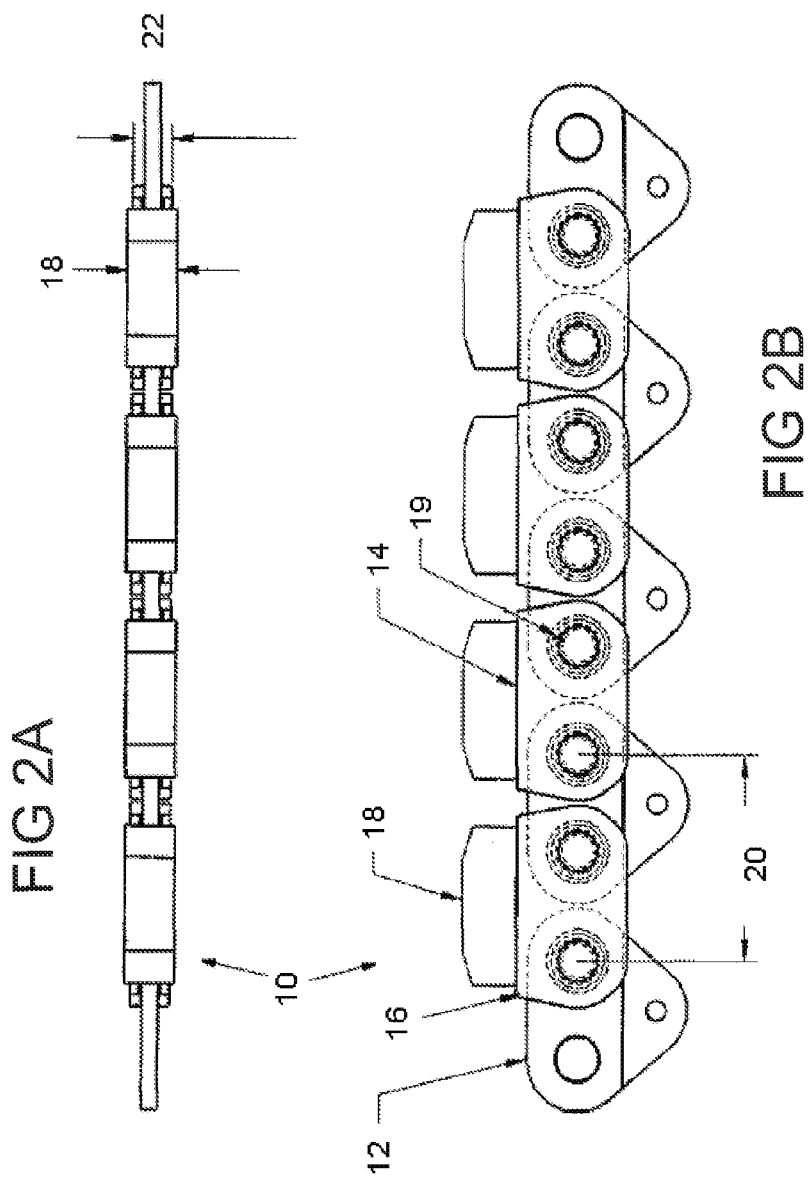

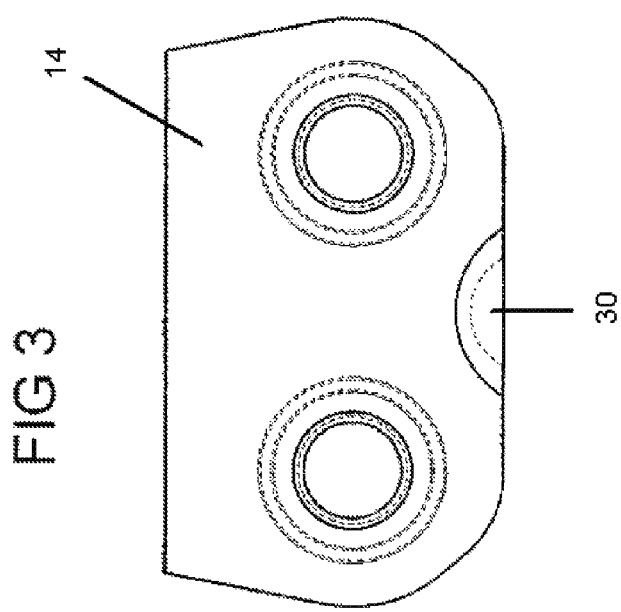

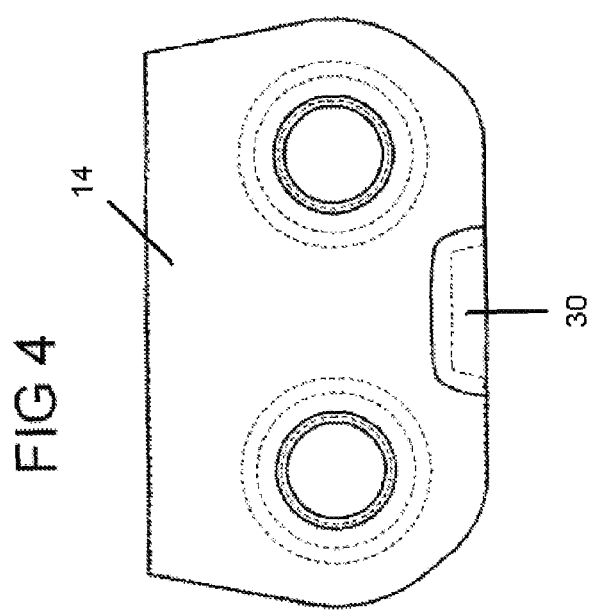

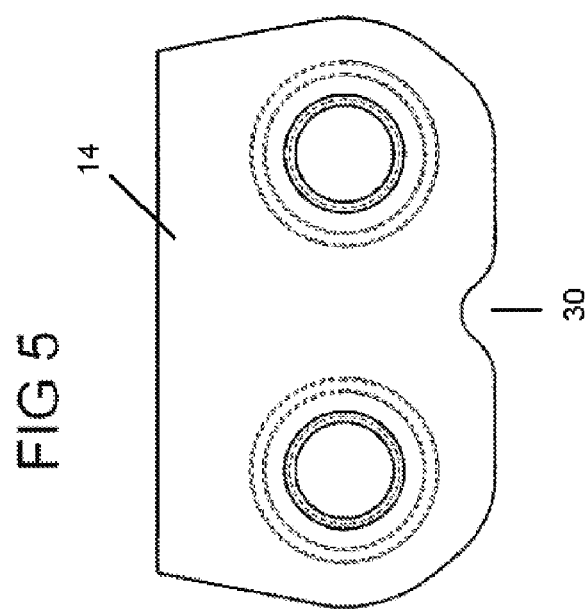

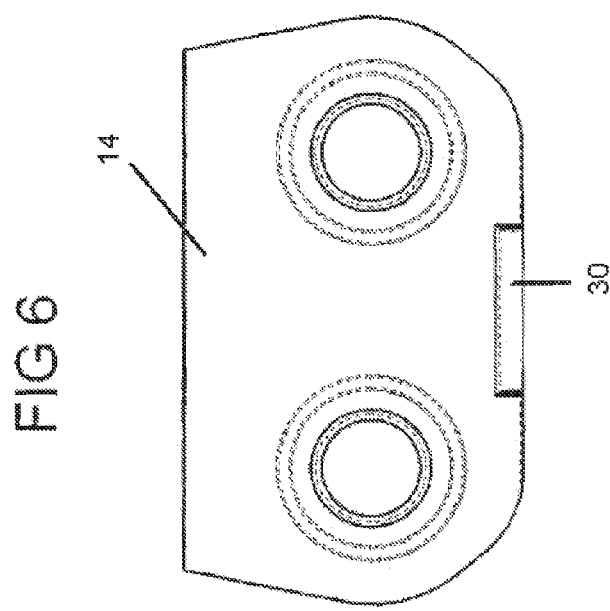

AGGREGATE CUTTING SAW CHAIN

RELATED APPLICATION

The present application claims priority to U.S. Provisional Patent Application No. 60/957,427, filed on 22 Aug. 2007, entitled "AGGREGATE CUTTING SAW CHAIN." The specification of said provisional application is hereby fully incorporated by reference in its entirety, except for those sections, if any, that are inconsistent with this specification

TECHNICAL FIELD

The present invention relates to the field of aggregate cutting chain saws and in particular to a saw chain adapted to have an optimized pitch to allow for improved cutting on handheld saws.

BACKGROUND

Since as early as the 1920s, chain saws have been used to cut wood. Chain saws generally include a power head that drives a saw chain around a guide bar. Chain saws generally come in two configurations: one includes a hand held power head that is handled manually by an operator; and the other includes a power source is part of a machine, such as a harvester, and the operator of the machine controls the cutting operation. The saw chain used for hand held saws and harvesters include a variety of standard and well established pitches.

Saw chain pitch is defined as the distance between any three consecutive rivets divided by two. For the hand held saws, due to power limitations and weight constraints, saw chain pitch has peaked at a maximum pitch of 0.404 inches in modern chain, with the most common pitch being between ¼ and ⅜ inch (e.g. 0.325 inch). Harvesters, on the other hand, have nearly infinite power, and because it is a machine weight is not a significant issue. Further, having a larger pitch, assuming sufficient power is available, increases the speed at which wood may be cut. Thus, Harvester saw chain has generally been held at a minimum of a 0.5 inch pitch, and goes up to and beyond a ¾ inch pitch, with ¾ inch pitch being the most common. While the harvester industry has in the past used a 0.404 inch pitch harvester chain for certain applications, the chassis width on such chains is nearly twice the thickness/width of 0.404 pitch chain used in aggregate or wood cutting operations on hand held saws. The harvester industry is moving away from using chain having a pitch of 0.404 inches, because even with the thicker chassis, such chains have been found to not be durable enough for the power and cutting conditions encountered in harvesters.

Since about the 1960s, it has been known that chain saws may be used for cutting aggregate materials, such as concrete. However, aggregate cutting chain saws were not generally commercialized until the 1990s. The saw chain used for cutting aggregate material differs from that of wood chain primarily in that it uses abrasive blocks instead of cutter links, which results in an abrading operation instead of a true cutting operation. However, for hand held aggregate chain saws, the same power and weight limitations exist, and thus the pitch of aggregate saw chain has been limited to that of the wood cutting saw chain for hand held power units. In order to increase the pitch beyond the 0.404 ceiling, two critical things are needed: first, a larger power head is required to produce more power in order to drive the chain; and second, the components of the chain needed to be scaled up (e.g. thickened) in order to withstand the greater torque encountered by the saw chain. The increased power results in a heavier chain saw, and the scaled up chain components not only results adding overall weight, but it also requires a widening of the kerf width thereby increasing the need for even more power.

For these reasons, just as in the wood cutting saw chain industry, aggregate cutting chain manufacturers have accepted the 0.404 pitch as the ceiling for saw chain used on aggregate cutting chain saws, with ⅜ inch pitch being the current commercially accepted practice. This allows for a chassis that can support a thin enough kerf width such that a lower power output power head may be used and still be sufficient to cut aggregate material. The lower power output power head is necessary to keep the overall weight of the chain saw at or below about 30 pounds, which is a weight deemed generally acceptable by the health and safety practices of the construction tool industry.

Another reason the industry has refrained from going with a larger/longer pitch, is because it presents fewer cutters on a loop of chain to remove material from the work piece. Accordingly, to maintain the same cutting speed each cutter in a longer pitch chain is required to remove more material per pass and thereby experiences increased forces and stress on the chain. Increased pitch typically has required unacceptable increases in features, such as component thicknesses, length, height power requirements, etc. in order to compensate for the increased cutting forces associated with the more aggressive cutters.

BRIEF DESCRIPTION OF THE DRAWINGS

FIGS. 1A and 2A are top views illustrating portions of saw chain in accordance with various embodiments of the invention;

FIGS. 1B and 2B are side views illustrating portions of saw chain in accordance with various embodiments of the invention; and FIGS. 3-6 illustrate side, top and end views of tie straps in accordance with various embodiments the invention.

DESCRIPTION OF THE PREFERRED EMBODIMENTS

In the following detailed description, reference is made to the accompanying drawings which form a part hereof, and in which are shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

The description may use perspective-based descriptions such as up/down, back/front, and top/bottom. Such descriptions are merely used to facilitate the discussion and are not intended to restrict the application of embodiments of the present invention.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other. For the purposes of the description, a phrase in the form "N/B" means A or B. For the purposes of the description, a phrase in the form "A and/or B" means "(A), (B), or (A and B)". For the purposes of the description, a phrase in the form "at least one of A, B, and C" means "(A), (B), (C), (A and B), (A and C), (B and C), or (A, B and C)". For the purposes of the description, a phrase in the form "(A)B" means "(B) or (AB)" that is, A is an optional element.

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

Embodiments of the present invention include an aggregate cutting saw chain adapted for use on a hand held chain saw having a pitch that exceeds the current limit of 0.404 inches, allows the use of a hand held chain saw having a weight of less than 30 pounds, and maintains a standard kerf width of about 0.225 inches or less. In various embodiments, to reduce bar rail wear and improve cutting performance, a featured tie strap may be used, wherein a fluid carrying feature within the tie strap may facilitate distribution of fluid to the wear interface between the guide bar rail and the tie strap. This not only reduces the bar rail wear rate, but also reduces the power input requirement.

FIGS. 1A, 1B, 2A, and 2B illustrate various side and end views respectively of aggregate cutting saw chain in accordance with embodiments of the invention. Saw chain 10 includes a plurality of drive links 12, which interface with a drive sprocket to cause the chain to circumnavigate a guide bar. Saw chain 10 also includes a plurality of cutter links 16, which carry abrasive members 18. Abrasive members 18 (e.g. diamond impregnated material) provide the cutting of aggregate through an abrading process. A plurality of side links 14 couple the drive links and the cutter links. All links are pivotally coupled via rivets and rivet holes 19. As illustrated in FIG. 1A certain embodiments may include a guard feature 23, which may help prolong the life of the cutter links 16.

In various embodiments, the width of the chain chassis, identified as chassis width 22, is dictated by the width of the grouping of components that generally include the tie strap 14, drive link 12 and cutter links 16. The kerf width likewise is dictated by the thickness of the cutting link abrasive members 18, which is generally slightly thicker than the chassis width 22. In various embodiments, the abrasive member 18 width (and thus generally Kerf width) is approximately 0.225 inches or less. Maintaining such a width helps reduce the power input requirement. Again prior to the present invention, conventional wisdom in the industry dictated that an increase in chain pitch necessarily required an increase in segment width and visa versa.

In various embodiments, the pitch—measured between three consecutive rivets, as shown by 20 and divided by two, may be increased well above the 0.404 ceiling, while maintaining a kerf width of about 0.225 inches and yet requiring a lower power input. In various embodiments, it has been found that the optimum pitch for an aggregate cutting saw chain will fall within the relatively narrow band of approximately 0.440 to approximately 0.450 inches. In one embodiment, a pitch of about 0.444 inches was found to be particularly well suited for improving performance, without exceeding kerf width and weight requirements. It is known that gasoline powered chain saws weighing in the 30 pounds or less region will have a power output of about 6.2 horsepower or less. Such a pitch range in accordance with embodiments of the invention allow for a power input of 6.2 horsepower or less, which in turn renders a hand held chain saw to be less than about 30 pounds and meet generally accepted weight parameters and practices.

In one embodiment, with the power limitation of about 6.2 horsepower, specifying the pitch to be from about 0.440 to about 0.450 inches further enables the use of aggregate chain components (e.g. drive links, tie straps, and cutter links) of a size that does not result in an increased chassis width and an increased kerf width. Specifically, the thickness of the components may be held to be the same as the thickness of conventional aggregate chain components, and yet result in a chassis having a stronger overall tensile strength than the conventional chain.

Such strength improvements may be attributable to several factors. One factor is that by increasing the pitch, the size of the side links and drive links are slightly enlarged in both length and height in order to maintain relational interface between the drive tangs and the sprockets. Such enlargement allows for more material to surround the rivet holes, thereby improving strength in one of the weaker parts of the chassis. Conventional wisdom teaches that the relationship between the increase in component dimensions and increase in strength is generally linear. Contrary to this conventional thinking in the industry, however, it has been found that the increase in chassis strength resulting from increasing the pitch into the 0.44 to 0.45 inch range yielded a far greater than linear tensile strength increase. In one embodiment, it was found that while the pitch was increased about 18% (from 3/8 inch to 0.444 inch), the tensile strength of the chain chassis increased about 54%.

In various embodiments, the optimum pitch of aggregate saw chain may be determined based on a balance of the desired weight of the chain saw, power input limits, chain strength requirements and kerf thickness. As described, providing a pitch of approximately 0.440 to 0.450 inches not only provides the unexpected result of a dramatically increased tensile strength, but it also helps achieve a balance of the aforementioned parameters. Again, increasing the pitch to this range defies conventional practice, as it has been long accepted in the aggregate saw chain (and wood saw chain) industry to keep the pitch at or below 0.404 inches in order to maintain weight, power, strength and kerf width within acceptable parameters and to achieve sufficient performance results.

FIGS. 3-6 illustrate various side, top and end views of tie straps in accordance with embodiments of the invention. Tie strap 14 may have a fluid distribution feature 30 disposed therein such that fluid (e.g. water) may be carried in these features as the tie strap traverses the rails of the guide bar. The fluid in the features may be gradually, but directly deposited onto the guide bar rail at the wear interface, thereby lubricating the rail for the other rail engaging links and straps that follow a particular tie strap. The additional lubrication of the rail helps resist rail wear, which in turn helps reduce the power input required for the same abrading activity.

In various embodiments, the fluid distribution feature may include pressing a portion of the tie strap between the rivet holes outward to thereby form a pocket to carry the fluid and/or to allow the fluid to engage a top surface of the rail for lubrication and to reduce the frictional interface. In various other embodiments, the feature may be coined, formed or otherwise disposed into the tie strap. Further, in various other embodiments, the cutter link bodies may include water distribution features similar to those described with respect to the side links. Further, featured tie straps may allow for the use of thinner sectioned tie straps to thereby reduce overall weight of the chain, but yet avoid the problem of knife edging.

In addition to the discussion and illustrations of various embodiments above, it is to be understood, however, that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein.

The invention claimed is:

1. An aggregate saw chain for a hand held chain saw comprising:
   a plurality of drive links and cutter links coupled together with tie straps, the drive links, tie straps and cutter links being pivotally coupled by rivets passing though aligned rivet holes;
   wherein the aggregate saw chain has a pitch within a range of approximately 0.440 inches to approximately 0.450 inches, and wherein the saw chain has a maximum width of approximately 0.225 inches.

2. The aggregate saw chain of claim 1, wherein the pitch is approximately 0.444 inches.

3. The aggregate saw chain of claim 1, wherein the tie straps include a fluid distribution feature that allows the fluid to be deposited at the interface between the tie strap and a guide bar rail.

4. The aggregate saw chain of claim 3, wherein the fluid distribution feature is an indentation and/or a notch in the side of the tie strap between a first and a second tie strap rivet hole.

5. A method manufacturing aggregate cutting saw chain for a hand held chain saw, comprising:
   providing a plurality of chain components including drive links, cutter links and tie straps;
   coupling the plurality of drive links with the plurality of cutter links using the tie straps;
   assembling the chain components such that the saw chain has a resulting pitch in the range of 0.440 inches to 0.450 inches.

6. The method of claim 5, wherein the assembling the chain components includes forming a saw chain with a pitch of approximately 0.444 inches.

7. A hand held chain saw comprising:
   a chain saw body weighing less than 30 pounds, the chain saw body including a guide bar; and
   a saw chain configured to traverse the guide bar, the saw chain comprising a plurality of drive links and cutter links coupled together with tie straps, the drive links, tie straps and cutter links being pivotally coupled by rivets passing though aligned rivet holes, wherein the saw chain has a pitch within a range of approximately 0.440 inches to approximately 0.450 inches, and wherein the saw chain has a maximum width of approximately 0.225 inches.

8. The hand held chain saw of claim 7, wherein the power output of the chain saw is about 6.2 horsepower or less.

\* \* \* \* \*